Jan. 22, 1963        D. E. SHUMAKE        3,074,693
HOUSE TRAILER SUPPORT
Filed Aug. 6, 1959                        2 Sheets-Sheet 1

David E. Shumake
INVENTOR.

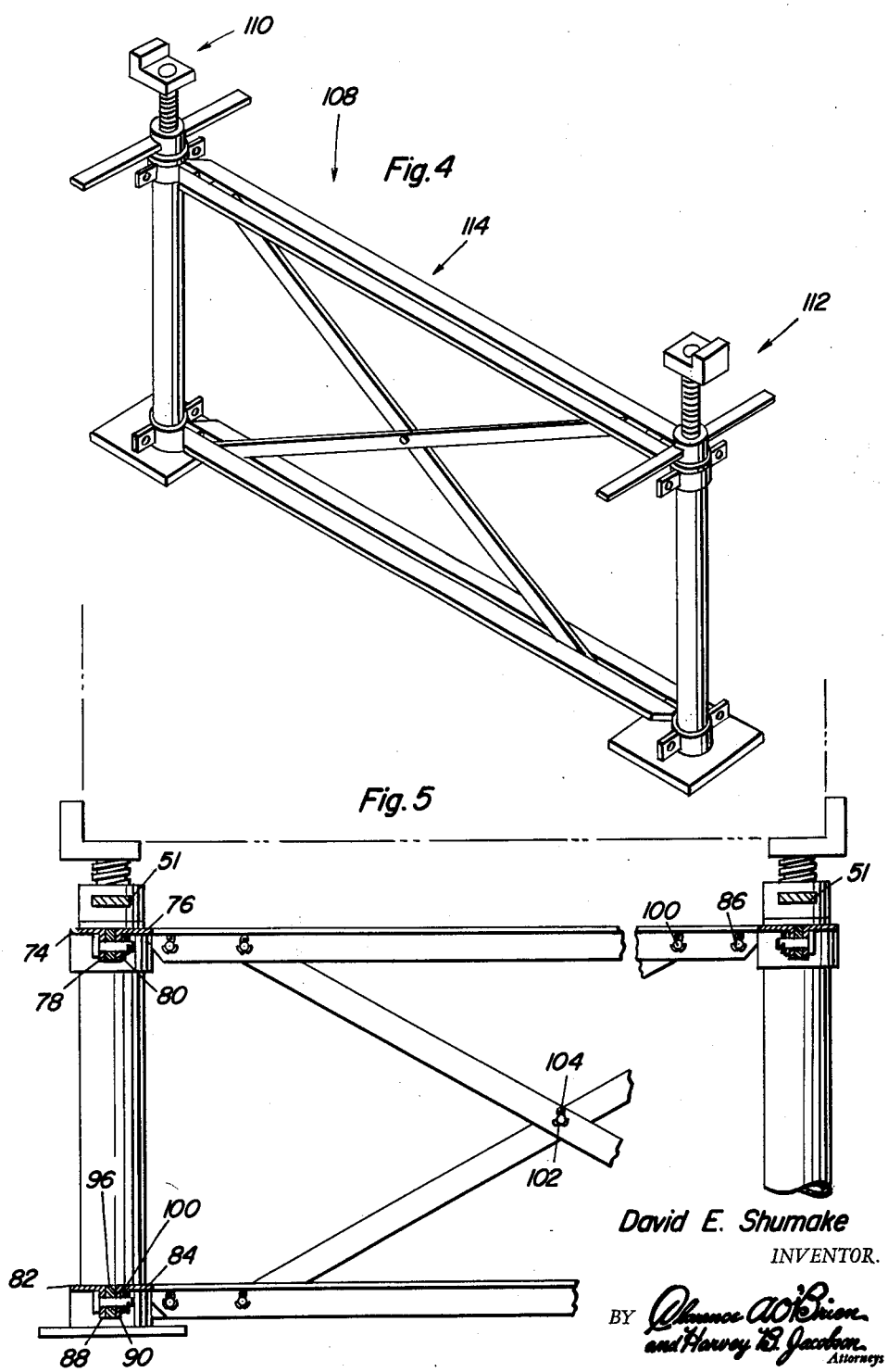

United States Patent Office 3,074,693
Patented Jan. 22, 1963

3,074,693
HOUSE TRAILER SUPPORT
David E. Shumake, Lompoc, Calif.
(501 Stockton Blvd., Sacramento, Calif.)
Filed Aug. 6, 1959, Ser. No. 831,974
5 Claims. (Cl. 254—92)

This invention relates generally to supporting structures and more particularly to jack support means for supporting house trailers.

In order to properly support trailers, it is desirable that the trailer wheels be lifted free of the ground and the trailer supported and braced both longitudinally and transversely so that a sturdy and rugged foundation is established. Many of the modern house trailers now in use are extremely large and accordingly utilize tandem wheel arrangements. Generally, individual jacks are utilized to support trailers at the corners thereof. However, it has been found that the jacks often do not adequately serve the purpose of stabilizing and securing the trailer against movement in any direction. Accordingly, it is the principal object of this invention to provide a novel jack support structure for trailers which will easily and properly support large trailers.

It is a further object of this invention to provide a novel jack support structure for tandem wheel trailers which includes a plurality of individual jack members which are rigidly connected to each other and which may be accommodated beneath the trailer axles for properly supporting the trailer. Beneath each of the four axles holding the tandem wheels, a jack member is placed. The jack members are positioned so that the points of contact with the trailer are directly under the plates joining the springs to the axles. Means, as in the form of pipe lengths, are inserted between the springs and frame for rigidifying the springs so that the jack members may lift the trailer wheels free of the ground. Brace elements connect each of the individual jack members to an adjacent jack member to define four sides of a rectangle with the jack members defining the corners thereof. Each of the rectangular sides includes horizontally disposed upper and lower cross braces. Each of the cross braces comprises a pair of spaced angle iron elements having downwardly extending legs positioned adjacent one another. Diagonally extending reinforcing elements connect the upper and lower cross braces. In order to support the front portion and the middle portion of the trailer, a structure including a pair of jack members may be provided. The jack members may be rigidly joined in the same manner as the jack members forming the rectangular structure as noted above. Each of the individual jack members includes a pipe portion and a base plate having a coupling threadedly engaged with the pipe portion. A bushing is seated on the upper end of the pipe portion and a screw extends through the bushing and into the pipe portion, a wing nut is threadedly received on the screw above the bushing and enables the screw to be lifted and lowered relative to the base. Accordingly, the trailer may be raised as desired and may be secured in a stable position to prevent either transverse or longitudinal movement thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of a pair of rigidly connected jack members; and

FIGURE 5 is a vertical sectional view taken substantially along the plane 5—5 of FIGURE 1.

Figures 1, 2, 3:
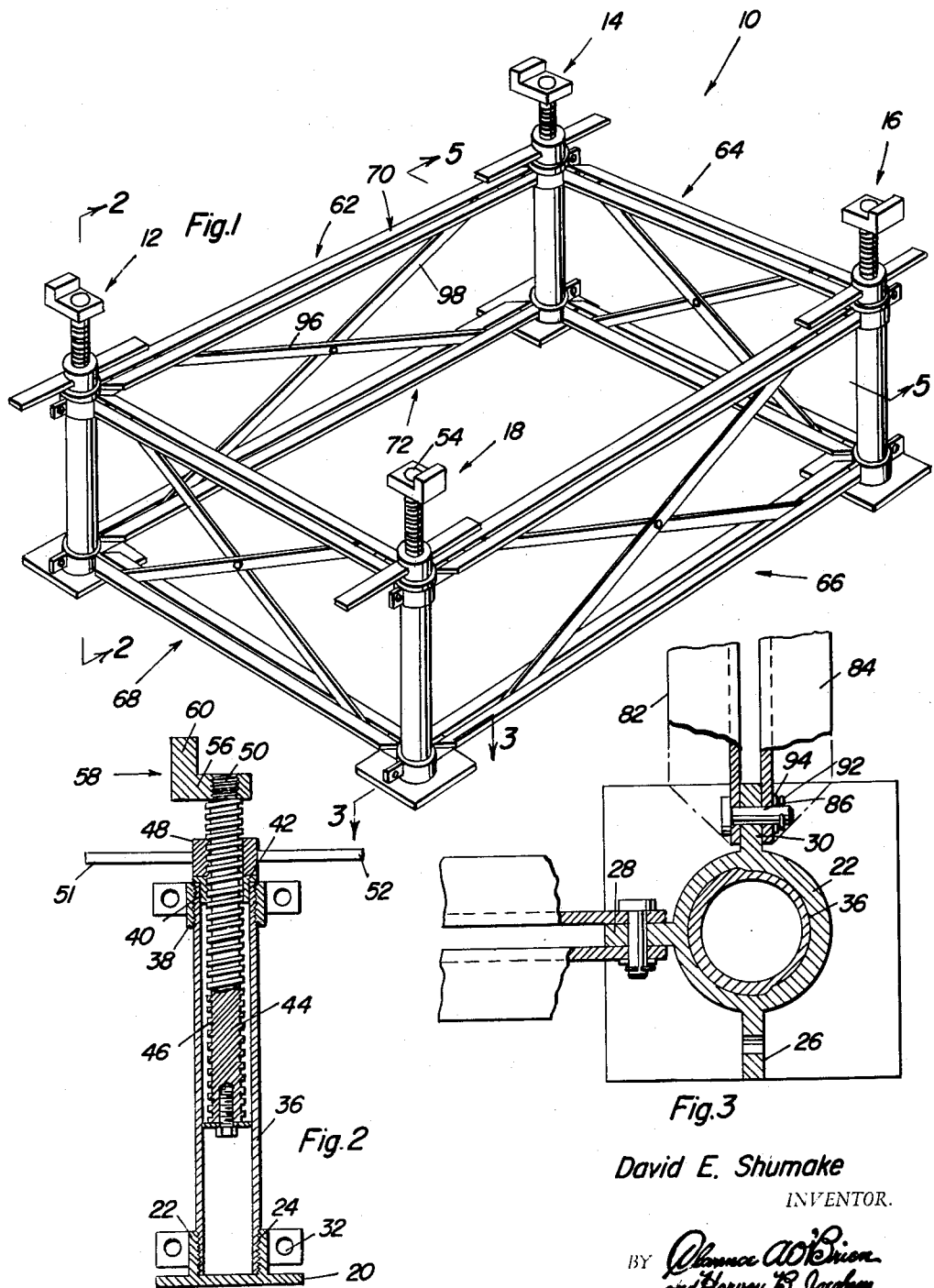
FIGURE 1 is a perspective view of the rectangular jack supporting structure utilized to support the trailer beneath the tandem wheeled arrangement thereof.
FIGURE 2 is a vertical sectional view taken substantially along the plane 2—2 of FIGURE 1.
FIGURE 3 is a horizontal sectional view taken substantially along the plane 3—3 of FIGURE 1.

With continuing reference to the drawings, numeral 10 generally represents the jack support structure adapted to be well utilized to support a tandem wheeled trailer. Initially, the structure 10 includes four jack support members generally designated as 12, 14, 16 and 18 since each of the jack support members are substantially alike, specific reference to the details of each will not be made but reference will be made to an exemplarly showing as in FIGURE 2.

Each jack member includes a base plate 20 of rectangular shape and having a flat bottom surface. A cylindrical coupling 22 is fixed to the base 20 as by welding and is internally threaded as at 24. Projecting radially from the coupling 22 are three lugs 26, 28 and 30. The lugs define a top surface which is flush with the top surface of the coupling 22 and the lugs extend radially a distance such that their outer edge is in alignment with the edges of base plate 20. Each of the lugs defines an aperture as at 32. Threadedly received within the coupling 22 and engaged with the threads 24 is a pipe portion 36 which extends perpendicularly upwardly from the base plate 20. The pipe portion 36 is externally threaded on both ends thereof. Threadedly received on the upper pipe portion end is a coupling 38 similar to the coupling 24 engaged with the pipe portion 36 on the lower end. The coupling 36 also has three lugs extending radially therefrom and in alignment with the lugs 26, 28 and 30 specifically designated on the lower coupling 22. It is to be noted that the lugs 26, 28 and 30 are preferably spaced by 90° about the axis of the pipe portion 36. Seated on the top surface of the pipe portion 36 is a brass bushing 40 terminally flanged at 42. A screw 44 having square threads 46 extends through the bushing 40 and into the pipe portion 36. A wing nut 48 is internally threaded and engaged with the square threaded screw 46. The wing nut 48 has radially extending wings 51 and 52 to facilitate the turning thereof. The screw 44 has a reduced end 50 which is threadedly received within the threaded aperture 54 defined in the horizontally disposed leg 56 of the L-shaped bracket member 58 having a vertically disposed leg 60.

Each of the individual jack members 12, 14, 16 and 18 are positioned as is illustrated in FIGURE 1 with the jack members defining corners of a rectangular area. Brace elements connect each of the individual jack members to an adjacent jack member so as to define four sides of the rectangular area. The sides are generally designated as 62, formed between jack members 12 and 14, 64 formed between jack members 14 and 16 and 66 formed between jack members 16 and 18 and 68 formed between jack members 18 and 12. Since each of the sides connecting the adjacent jack members are identical, a single explanation shall be offered which should suffice to clarify the construction of all of the sides.

Each of the sides includes an upper cross brace 70 and a lower cross brace 72. The cross braces 70 and 72 include a pair of angle members 74 and 76 (FIGURE 5) which are slightly spaced from each other but which have depending legs 78 and 80 extending downwardly parallel and adjacent to one another. The angle members 74 and 76 are secured to the upper couplings 38 by a pin which passes through aligned apertures in the vertical legs of the angle members and the lug and which is secured, as by a cotter pin. The lower cross member includes angle members as 82 and 84 which are fastened to a lug as 30 (FIGURE 3) and which has a headed pin 86 passing through aligned apertures in the depending legs 88 and 90 in the angle members and through the aperture 32 in lug 30 and which is secured by a wire or cotter pin 92. A washer as 94 may be utilized if desired. It will therefore be seen that the upper and lower cross braces 70 and 72 rigidly secure the jack members 12, 14, 16 and 18 to each other as indicated in FIGURE 1.

In order to further strengthen and support the structure so as to enable a house trailer to be efficiently and securely held, diagonally disposed reinforcing elements as 96 and 98 extend between the upper and lower cross braces 70 and 72 and are secured between the downwardly extending legs of the angle members receiving pins as 100 through aligned apertures in the depending legs and the diagonally disposed reinforcing elements 96 and 98. The reinforcing elements 96 and 98 may in turn receive a pin 102 at the intersection thereof secured by a cotter pin 104.

It will accordingly be appreciated that the structure 10 illustrated in FIGURE 1 may be placed beneath the tandem wheel arrangement of a house trailer and the individual jack members may be lengthened by manipulation of the wings 51 and 52 so as to move the screw 44 to engage the bracket 58 with the trailer.

Now referring to FIGURE 4, a supporting structure generally designated as 108 is illustrated wherein only two jack members as 110 and 112 are utilized for positioning beneath the front or middle portion of the trailer for supporting the trailer in conjunction with the structure 10 illustrated in FIGURE 1. A side 114 similar to any of the sides 62, 64, 66, 68, connects the jack members 110 and 112. The constructional features of the connection are identical to those disclosed above in connection with the explanation of the structure 10.

From the foregoing, it will be appreciated that improved support means have been disclosed for properly securing a house trailer in a stable position so as to prevent separate and unstable movement of the conventional individual jacks now utilized.

The foregoing is considered as illustrative only of the principles of the invention. Further, since numerous modifications and changes will readily occur to those skilled in the art, it is not desired to limit the invention to the exact construction and operation shown and described, and accordingly all suitable codifications and equivalents may be resorted to, falling within the scope of the invention as claimed.

What is claimed as new is as follows:

1. For use with house trailers and the like including a main frame and a supporting wheel assembly supported from said frame, a jack structure comprising more than two jacks, said jacks spaced apart from each other and positioned to define corners of a polygon, bracing sides connecting adjacent ones of said jacks forming sides of said polygon, each of said sides including a pair of horizontally disposed upper and lower cross-braces removably secured at opposite end portions to upper and lower ends of the corresponding jacks, and crossed diagonally extending reinforcing elements secured between opposite end portions of corresponding pairs of upper and lower cross braces spaced from the terminal ends of the latter, the terminal ends of said cross braces being removably secured to the corresponding end of the adjacent jack.

2. The combination of claim 1 including radially outwardly projecting lugs carried by and fixedly supported from opposite ends of each of said jacks, said terminal ends being removably secured to the corresponding lugs.

3. The combination of claim 2 wherein each of said cross braces comprises a pair of generally parallel laterally space dangle iron elements having legs extending downwardly adjacent each other, said diagonal elements each having their opposite ends secured between corresponding legs spaced from the terminal ends thereof, the terminal ends of said legs snugly receiving therebetween the corresponding lug and being removably secured thereto.

4. The combination of claim 3 wherein the mid portions of each pair of cross diagonal elements are secured together.

5. The combination of claim 4 wherein each of said jacks comprises a base plate having a coupling secured thereto, an upright pipe portion having its lower end threadedly engaged with said coupling, a bushing carried by and projecting above the upper end of said pipe portion, a screw extending through said bushing, a wing nut threadedly received on said screw above said bushing.

References Cited in the file of this patent

UNITED STATES PATENTS

| | | |
|---|---|---|
| 201,173 | Fayette | Mar. 12, 1878 |
| 968,315 | Beckert | Aug. 23, 1910 |
| 1,054,246 | Stauffer | Feb. 25, 1913 |
| 1,514,262 | Santmyer | Nov. 4, 1924 |
| 1,552,333 | Mosher | Sept. 1, 1925 |
| 1,676,538 | Foster | July 10, 1928 |
| 2,404,276 | Cohen | July 16, 1946 |
| 2,506,634 | Fields | May 9, 1950 |
| 2,614,800 | Garlinger et al. | Oct. 21, 1952 |
| 2,724,572 | Weinberg | Nov. 22, 1955 |